(12) United States Patent
Sawada

(10) Patent No.: US 8,074,075 B2
(45) Date of Patent: Dec. 6, 2011

(54) AUTHENTICATION SYSTEM

(75) Inventor: Kensuke Sawada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1059 days.

(21) Appl. No.: 11/312,935

(22) Filed: Dec. 21, 2005

(65) Prior Publication Data

US 2007/0038860 A1 Feb. 15, 2007

(30) Foreign Application Priority Data

Aug. 9, 2005 (JP) ................. 2005-230635

(51) Int. Cl.
*G06F 21/00* (2006.01)

(52) U.S. Cl. ........ 713/182; 713/183; 713/184; 713/185; 713/186

(58) Field of Classification Search ............... 726/2–21; 713/182–186
See application file for complete search history.

(56) References Cited

U.S. PATENT DOCUMENTS

| | | | |
|---|---|---|---|
| 6,275,941 B1 * | 8/2001 | Saito et al. ................. | 726/2 |
| 6,317,834 B1 * | 11/2001 | Gennaro et al. ............. | 713/186 |
| 7,188,360 B2 * | 3/2007 | Gerdes et al. ............... | 726/4 |
| 2002/0080968 A1 | 6/2002 | Olsson | |
| 2002/0133725 A1 * | 9/2002 | Roy et al. .................... | 713/202 |
| 2003/0035544 A1 * | 2/2003 | Herle et al. .................. | 380/270 |
| 2003/0182435 A1 * | 9/2003 | Redlich et al. .............. | 709/229 |
| 2005/0005113 A1 * | 1/2005 | Dillon et al. ................ | 713/168 |

FOREIGN PATENT DOCUMENTS

| | | |
|---|---|---|
| JP | 2001216222 | 8/2001 |
| JP | 2002015132 | 1/2002 |
| JP | 2002-041522 | 2/2002 |
| JP | 2004013554 | 1/2004 |
| JP | 2005092769 | 4/2004 |
| WO | WO 98/52379 | 11/1998 |
| WO | 02/47349 A2 | 6/2002 |

OTHER PUBLICATIONS

Extended European search report, Dec. 18, 2006, Application No. EP 05 25 8006.
Chinese OA w/Eng. trans. dated Apr. 3, 2009 corres. to Chinese Patent Application No. 20061000127.X.
Notice of Reason for Rejection dated Jan. 25, 2011 issued in the corresponding Japanese application No. 2005-230635.
Japanese Notice of Reason for Rejection dated Apr. 19, 2011 for application No. 2005-230635.
Japanese Decision of Dismissal of Amendment dated Sep. 13, 2011 application No. 2005-230635.

* cited by examiner

*Primary Examiner* — Nasser Moazzami
*Assistant Examiner* — Ghazal Shehni
(74) *Attorney, Agent, or Firm* — Murphy & King, P.C.

(57) ABSTRACT

To provide an authentication technology making it compatible to facilitate inputting of authentication information and to ensure the security. An authentication device connected to a transmitting terminal and a receiving terminal via a communication line, receives a message from the transmitting terminal, receives authentication information from the transmitting terminal, registers the message in association with the authentication information, receives a request with a purport of acquiring the message from the receiving terminal, determines, based on the authentication information received from the receiving terminal and the registered authentication information, whether to authenticate or not, and, if authenticated, transmits the message to the receiving terminal.

17 Claims, 16 Drawing Sheets

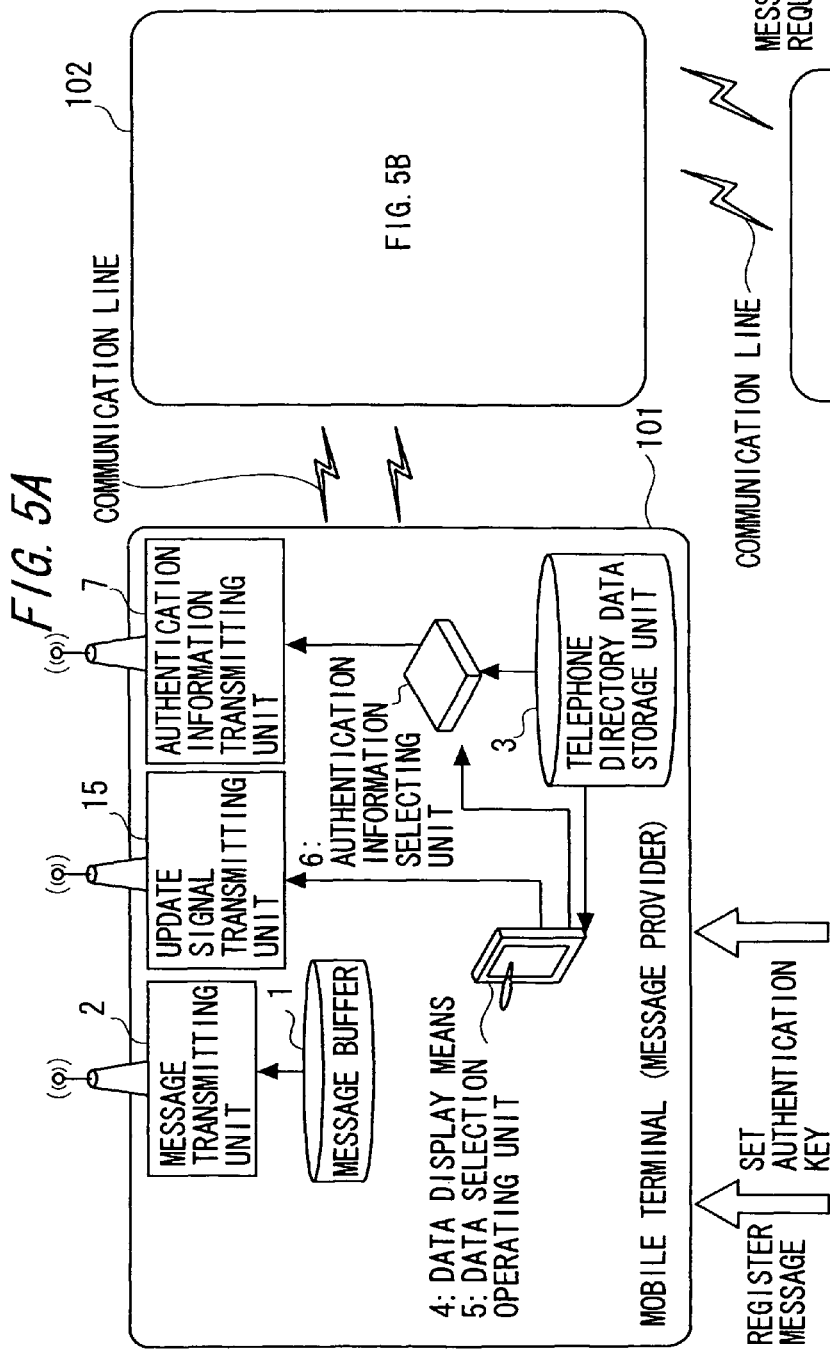

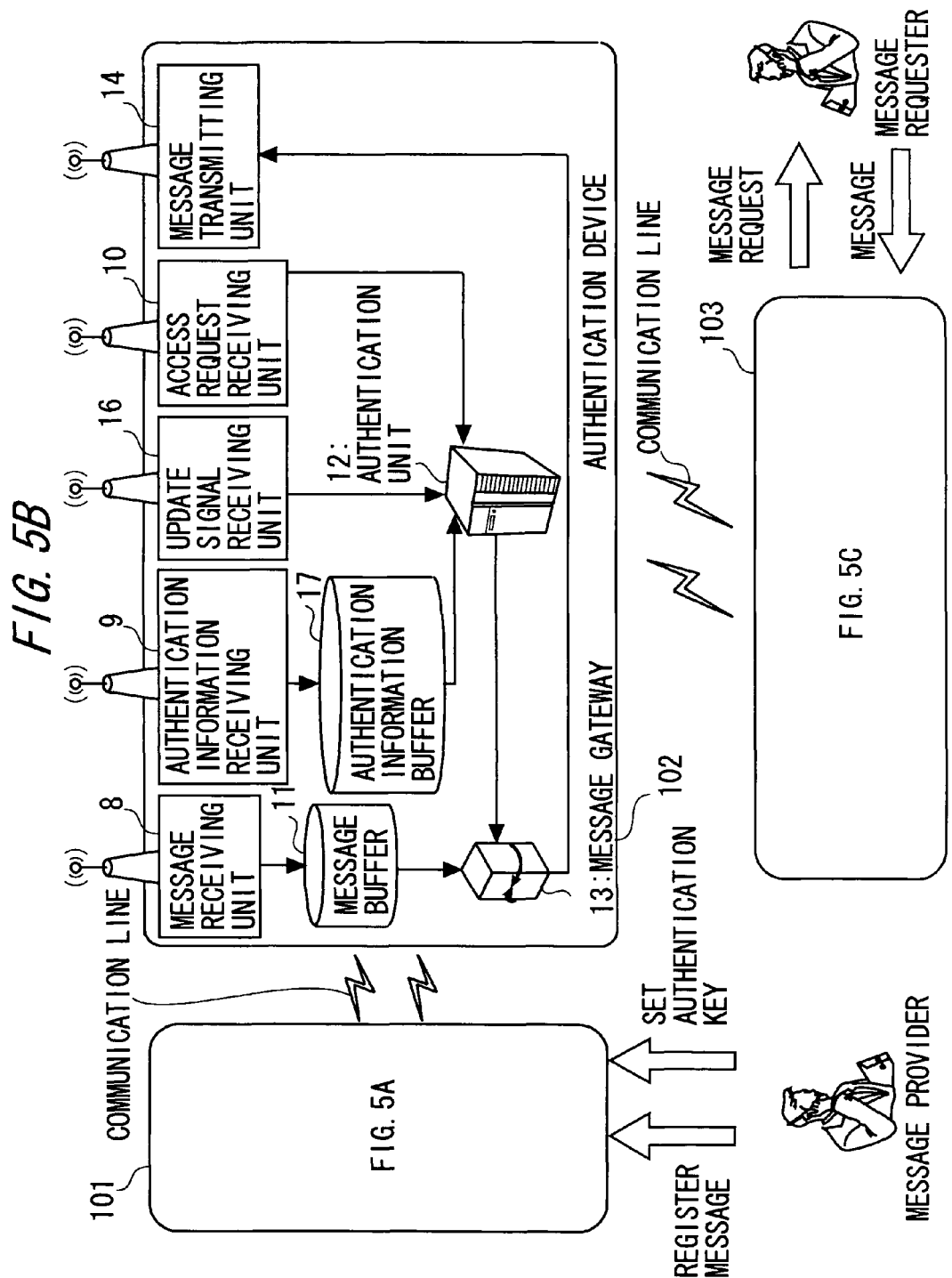

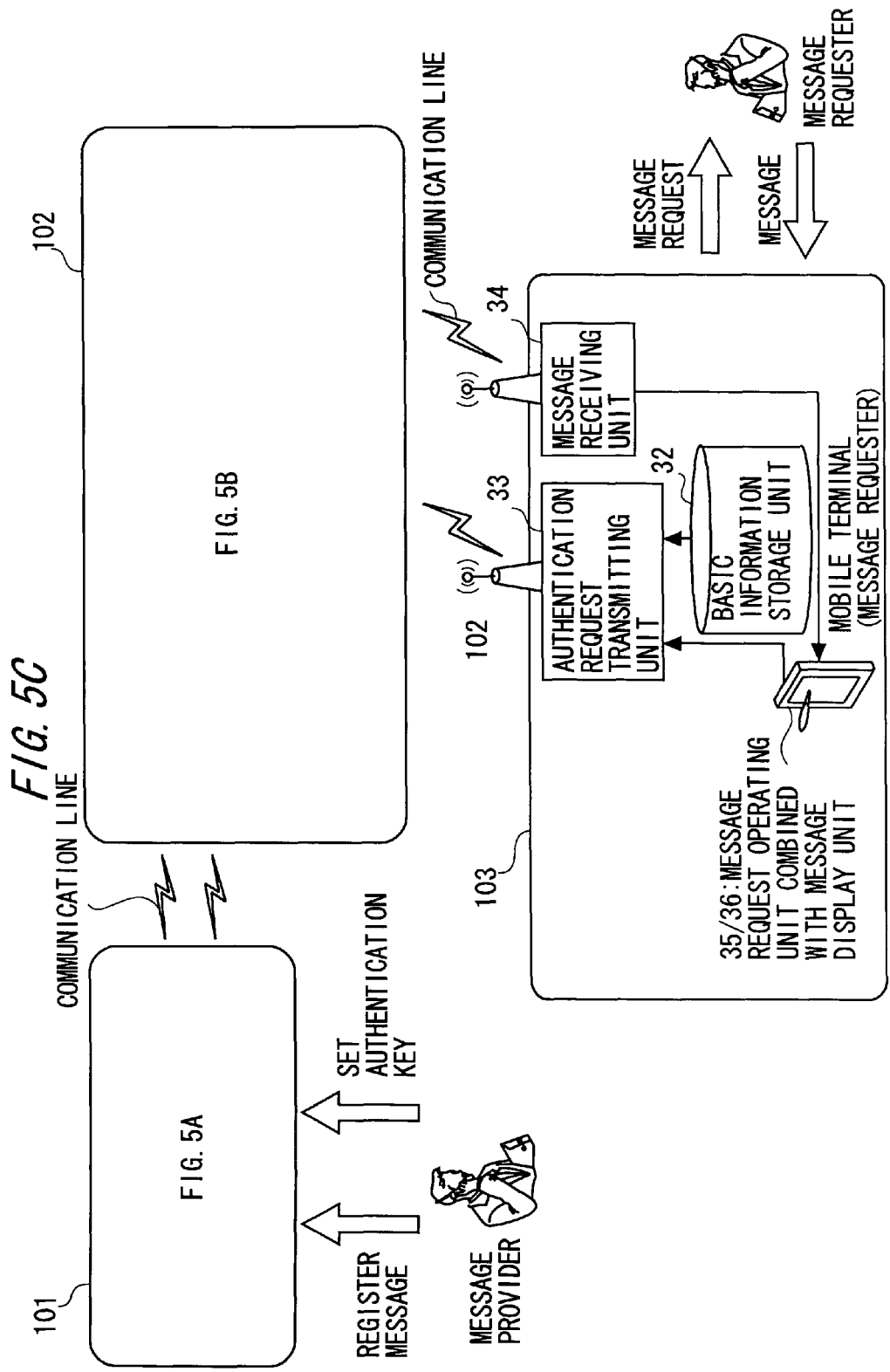

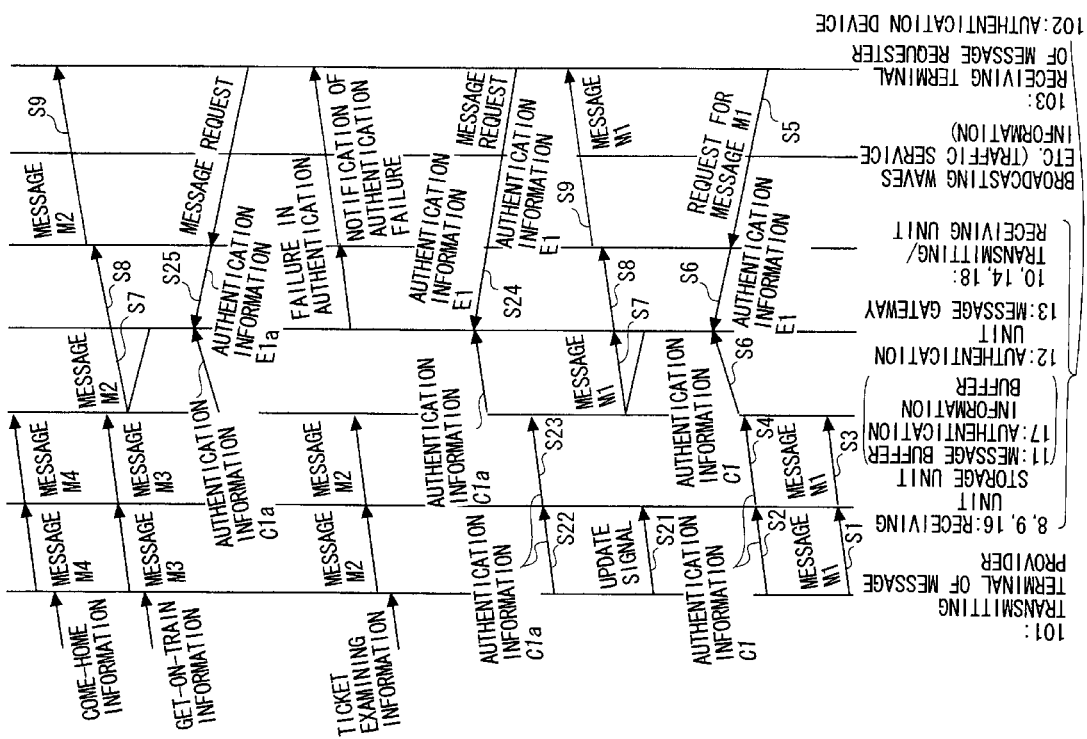

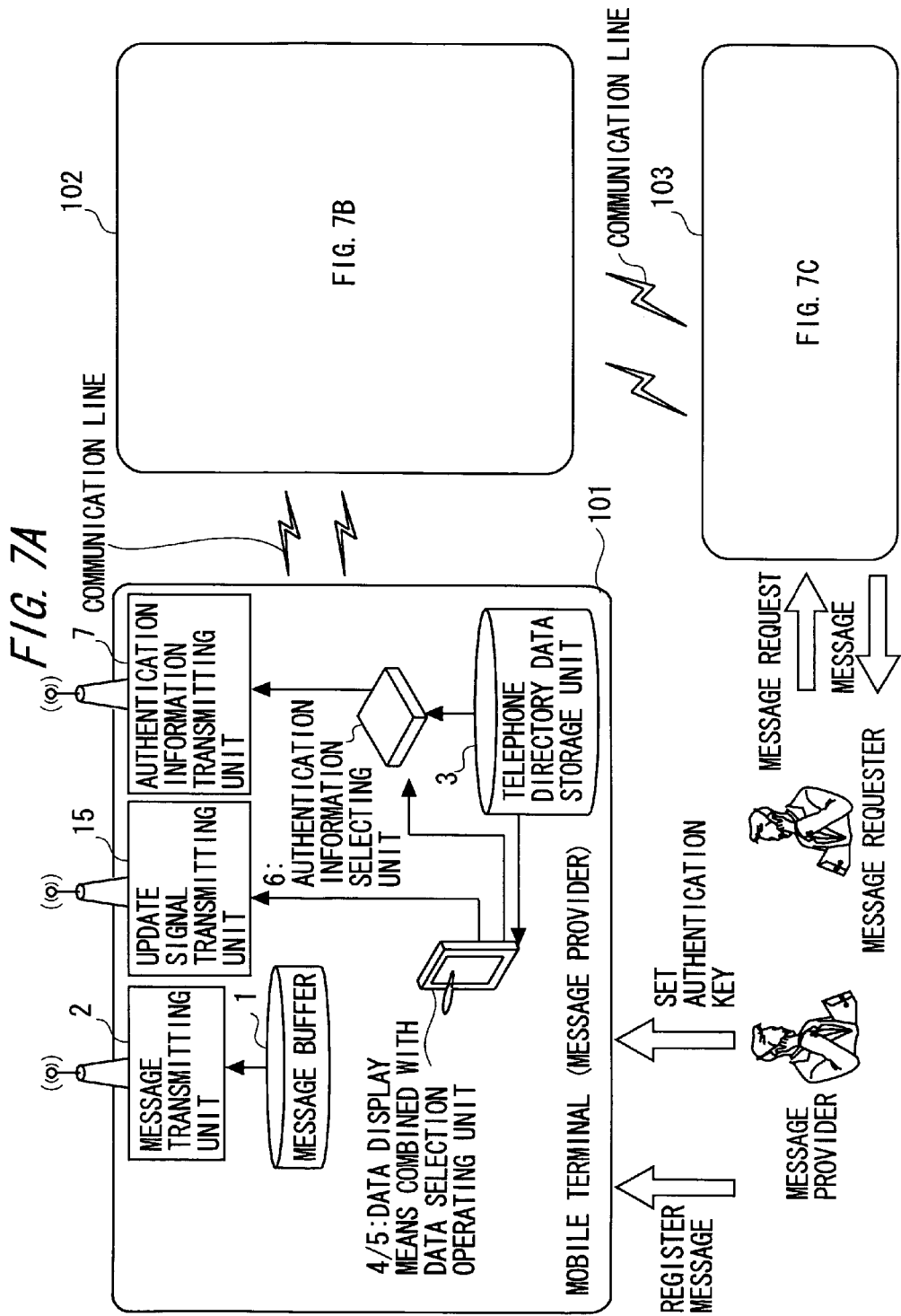

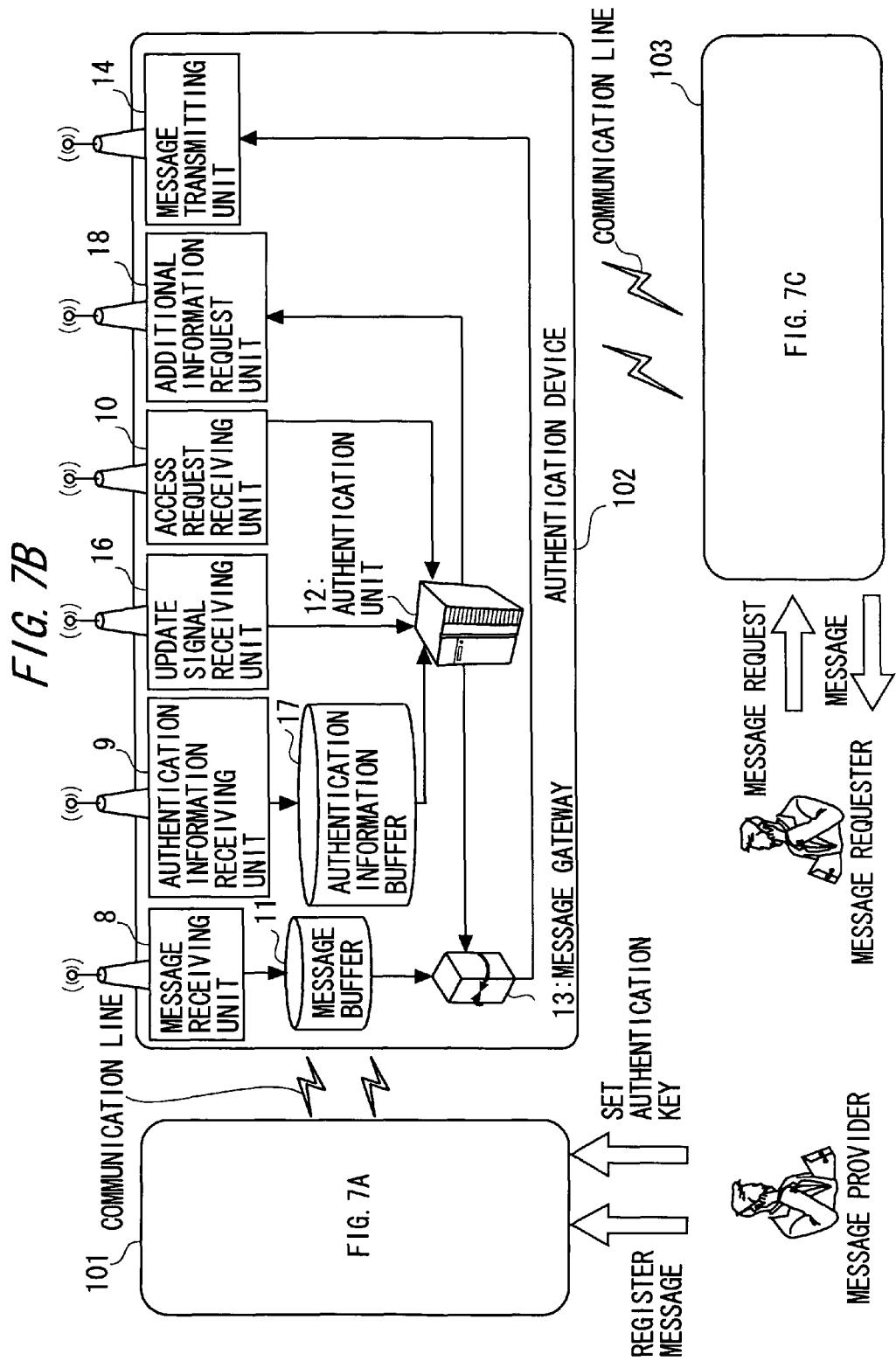

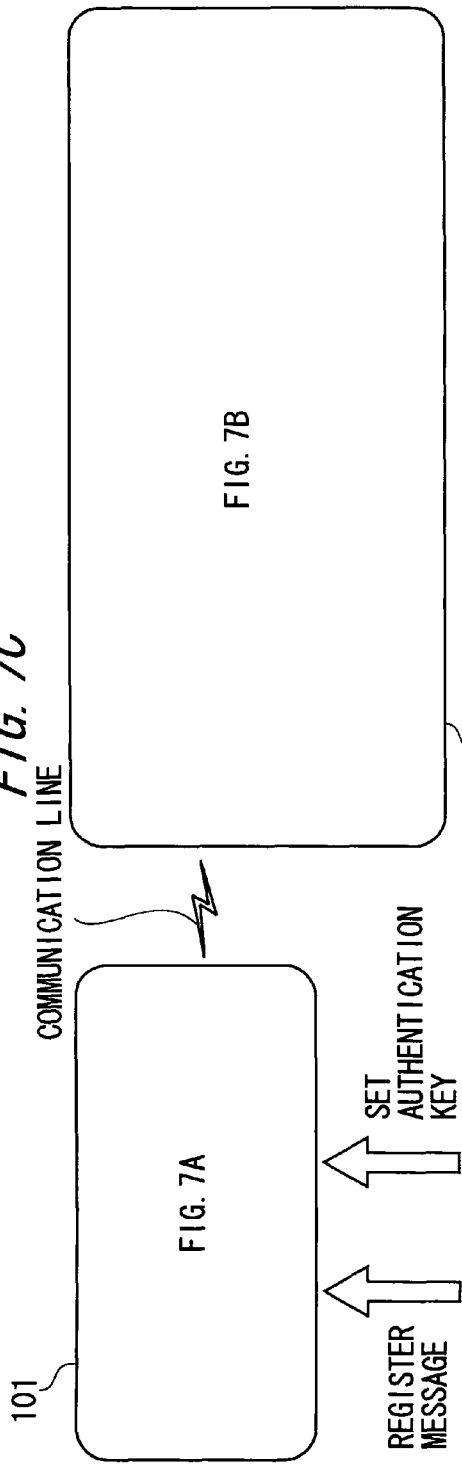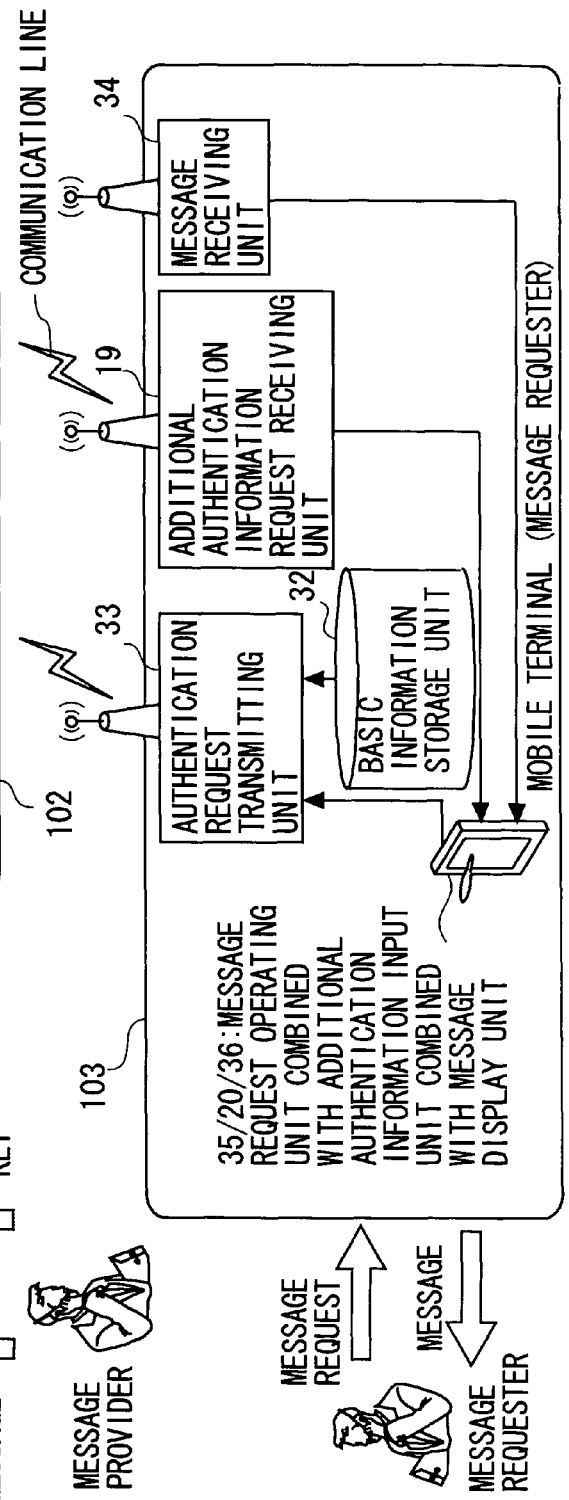

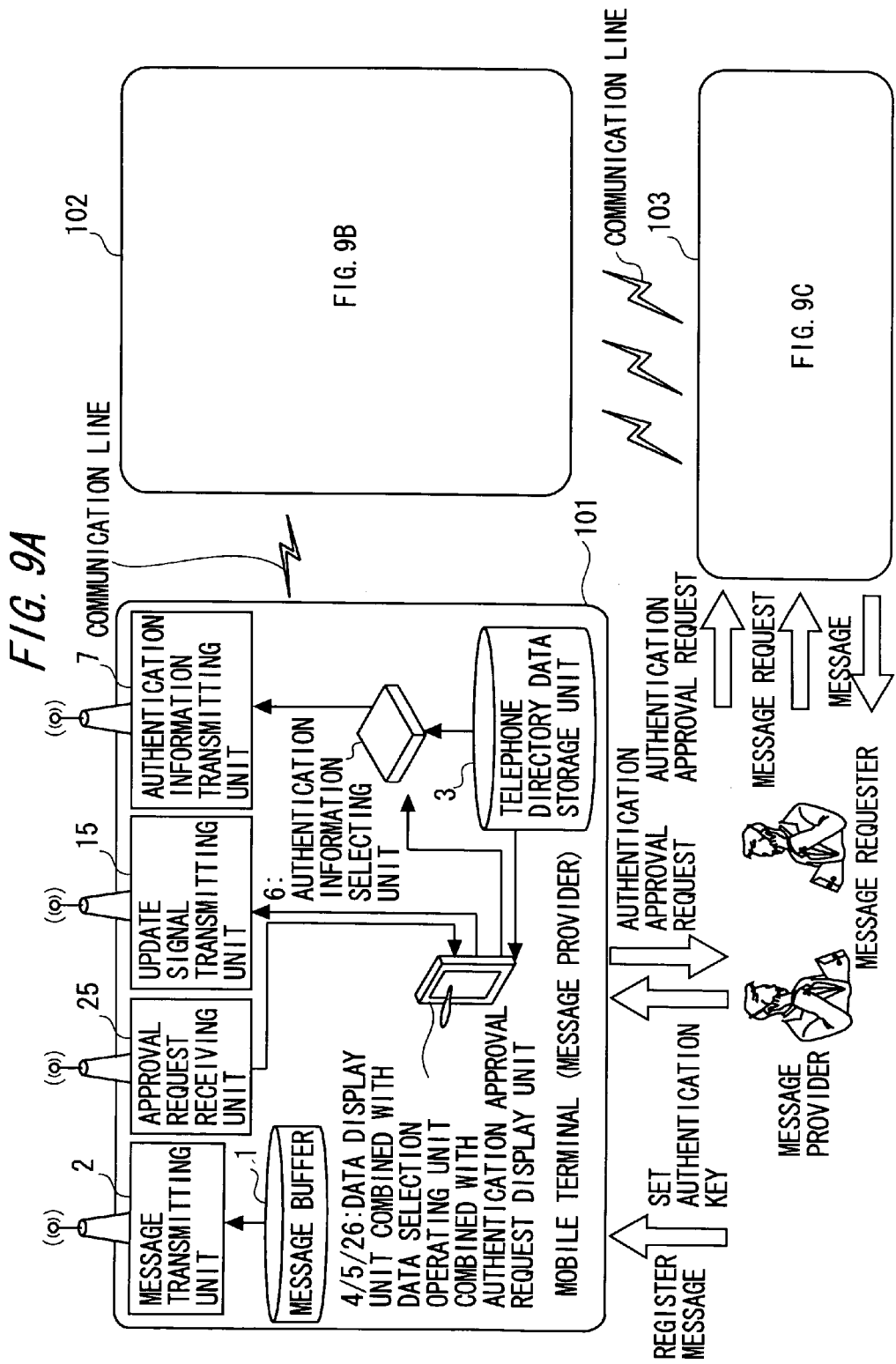

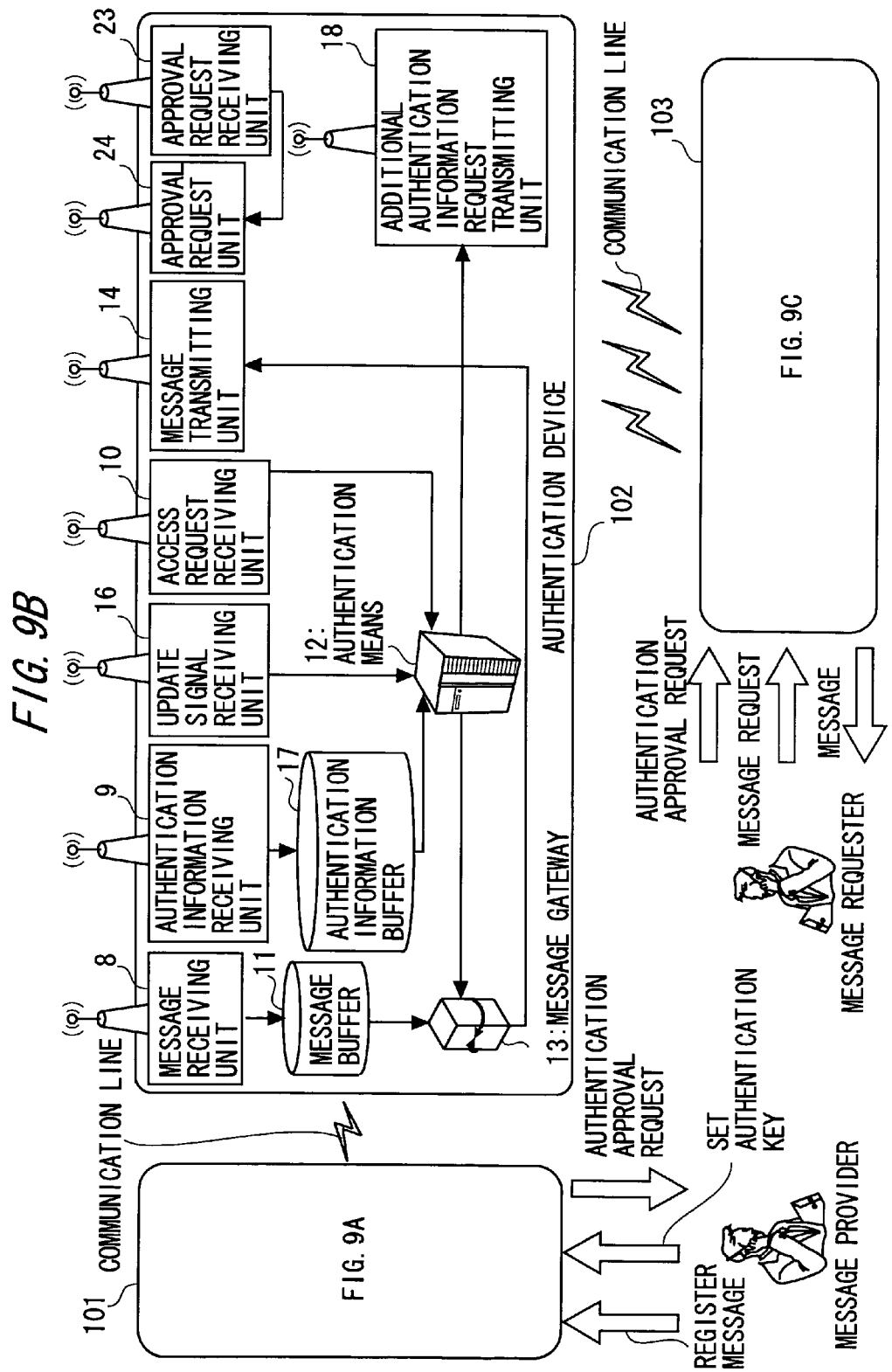

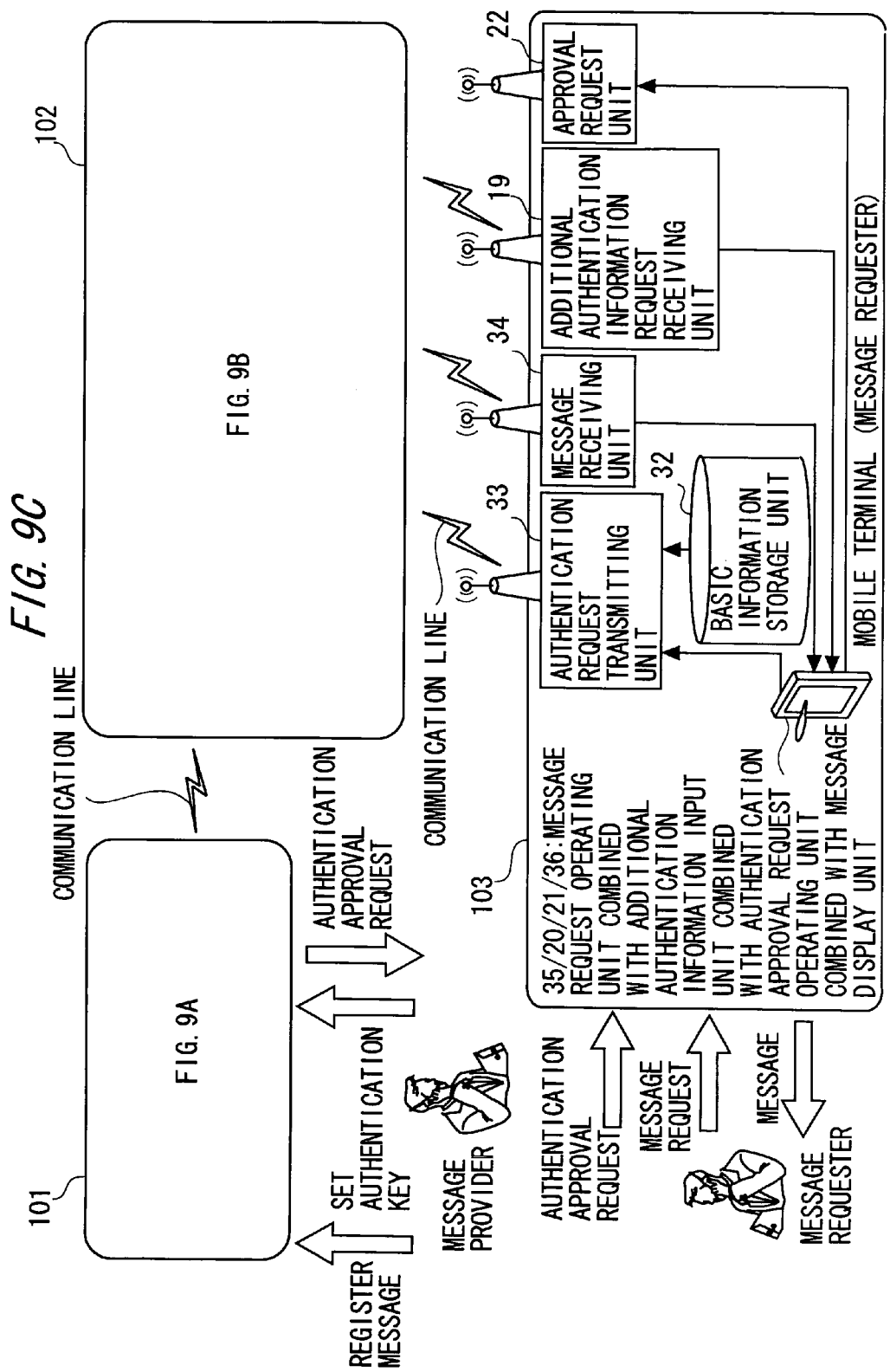

AUTHENTICATION SYSTEM

BACKGROUND OF THE INVENTION

The invention relates to an authentication technology on the occasion of providing a message via a communication line.

Over the recent years, a wireless terminal device as typified by a cellular phone has been diversified in its function and has become capable of managing multiple items of information about a terminal user. Herein, one item of information to be managed is location information of the terminal, and at the present a service for disclosing the location information to others is being actualized. The location information of the terminal is personal information of the individual user carrying the terminal, and hence access control is required to be done so as to authenticate a person who requests the disclosure of the location information and to disclose the location information to only specified persons authenticated. A general authentication method, which is now being utilized, is a method employing an ID and a password. Therefore, it is required that both of an information provider and an information requester manage the IDs and the passwords In the case of the authentication using the ID and the password, supposing that the information provider side is a mobile terminal, a problem is that an input of the information such as the ID and the password for authenticating the information requester is extremely time-consuming. Hence, there is demanded an authentication technology capable of inputting the information by a simple operation and actualizing firm security.

On the other hand, a personal information disclosure system is proposed, wherein an information registrant registers a server with the information to be disclosed and a mail address and a name of a person who approves the disclosure, and, when the terminal of the information requester requests the server to disclose the information, it is judged whether the disclosure request is valid or not, depending on whether or not the name and the mail address of the requester are previously registered (Patent document 1).

[Patent document 1] Japanese Patent Application Laid-Open Publication No. 2002-41522

SUMMARY OF THE INVENTION

As described above, in the case of using the mail address and the name of the requester as the information for the authentication as described above, the inputting can be facilitated as by diverting the data of an application for e-mail and so on, however, there is a high possibility that the authentication information might be known to others. It is therefore considered difficult to actualize the firm security.

Such being the case, it is an object of the invention to actualize an authentication technology making it compatible to facilitate the inputting of the authentication information and to ensure the firm security.

The invention adopts the following configurations in order to solve the problems.

Namely, an authentication system of the invention comprises a transmitting terminal, a receiving terminal and an authentication device that are connected via a communication line, the transmitting terminal comprising:

message transmitting unit (means) transmitting and registering a message to and in the authentication device;

information storage unit (means) stored with plural items of information;

selecting unit (means) selecting, from the information storage unit (means), an arbitrary item of information as authentication information for accessing the message; and authentication information transmitting unit (means) transmitting the authentication information to the authentication device, the authentication device comprising;

message receiving unit (means) receiving the message from the transmitting terminal;

authentication information receiving unit (means) receiving the authentication information from the transmitting terminal;

registering unit (means) registering the message and the authentication information in a way that associates the message and the authentication information with each other;

request receiving unit (means) receiving a request showing a purport of acquiring the message from the receiving terminal; authenticating unit (means) determining, based on the authentication information received from the receiving terminal and the authentication information registered on the registering unit (means), whether to authenticate or not; and message transmitting unit (means) transmitting, if authenticated by the authenticating unit, the message to the receiving terminal.

The receiving terminal may comprise message request unit (means) requesting acquisition of the message, authentication information transmitting unit (means) transmitting the authentication information for acquiring the message to the authentication device, and message receiving unit (means) receiving the message from the authentication device.

The transmitting terminal may comprise updating unit (means) transmitting update information for updating the authentication information to the authentication device, and the authentication device comprises updating unit updating the authentication information registered on the registering unit on the basis of the update information.

The authentication device may comprises addition request unit (means) requesting, if the authentication information received from the receiving terminal is deficient for the authentication information registered on the registering unit, the receiving terminal to add the authentication information.

The receiving terminal may comprise approval request unit (means) transmitting an approval request signal to the authentication device, the transmitting terminal may comprise approval request receiving unit (means) receiving the approval request signal from the authentication device, and approval notifying unit (means) transmitting an approval signal for approving the authentication of the receiving terminal to the authentication device, the authentication device may comprise approval request transferring unit (means) transferring the approval request signal from the receiving terminal to the transmitting terminal, and the authenticating unit may authenticate the message acquisition by the receiving terminal when receiving the approval signal from the transmitting terminal.

The transmitting terminal may store the information storage unit with plural items of information each having an item name and an item content, the authentication information transmitting unit may transmit at least the item name as the authentication information to the authentication device, and the authentication device may comprise authentication information request unit (means) requesting the receiving terminal for the authentication information on the basis of the item name.

Further, an authentication method, of the invention, executed by an authentication device connected to a transmitting terminal and a receiving terminal via a communication line, comprises steps of:

receiving a message from the transmitting terminal;

receiving authentication information from the transmitting terminal;

registering the message and the authentication information in a way that associates the message and the authentication information with each other;

receiving a request showing a purport of acquiring the message from the receiving terminal;

determining, based on the authentication information received from the receiving terminal and the registered authentication information, whether to authenticate or not; and transmitting, if authenticated, the message to the receiving terminal.

In the authentication method, when receiving the update information for updating the authentication information from the transmitting terminal, the registered authentication information may be updated based on the update information.

Moreover, if the authentication information received from the receiving terminal is deficient for the registered authentication information, the receiving terminal may be requested to add the authentication information.

When receiving the approval request signal from the receiving terminal, the approval request signal may be transferred to the transmitting terminal, and when receiving from the transmitting terminal an approval signal for approving the authentication of the receiving terminal, message acquisition by the receiving terminal may be authenticated.

When receiving at least an item name as the authentication information from the transmitting terminal, the authentication information may be requested of the receiving terminal on the basis of the item name.

Further, the invention may also be a program for making a computer execute the authentication method. Still further, the invention may also be a readable-by-computer recording medium recorded with this program. The computer is made to read and execute the program on this recording medium, whereby the functions thereof can be provided.

Herein, the recording medium readable by the computer connotes a recording medium capable of storing information such as data, programs, etc. electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the recording mediums fixed within the computer.

According to the invention, it is possible to provide the authentication technology making it compatible to facilitate the inputting of the authentication information and to ensure the security.

BRIEF DESCRIPTION OF THE DRAWINGS

FIG. 5A-5C are schematic diagrams of an architecture of the authentication system in a second embodiment according to the invention.

FIG. 6 is an explanatory diagram of the authentication method in the second embodiment according to the invention.

FIG. 7A-7C are schematic diagrams of an architecture of the authentication system in a third embodiment according to the invention.

FIG. 9A-9C are schematic diagrams of an architecture of the authentication system in a fourth embodiment according to the invention.

DETAILED DESCRIPTION OF THE PREFERRED EMBODIMENT

First Embodiment

Figure 1:
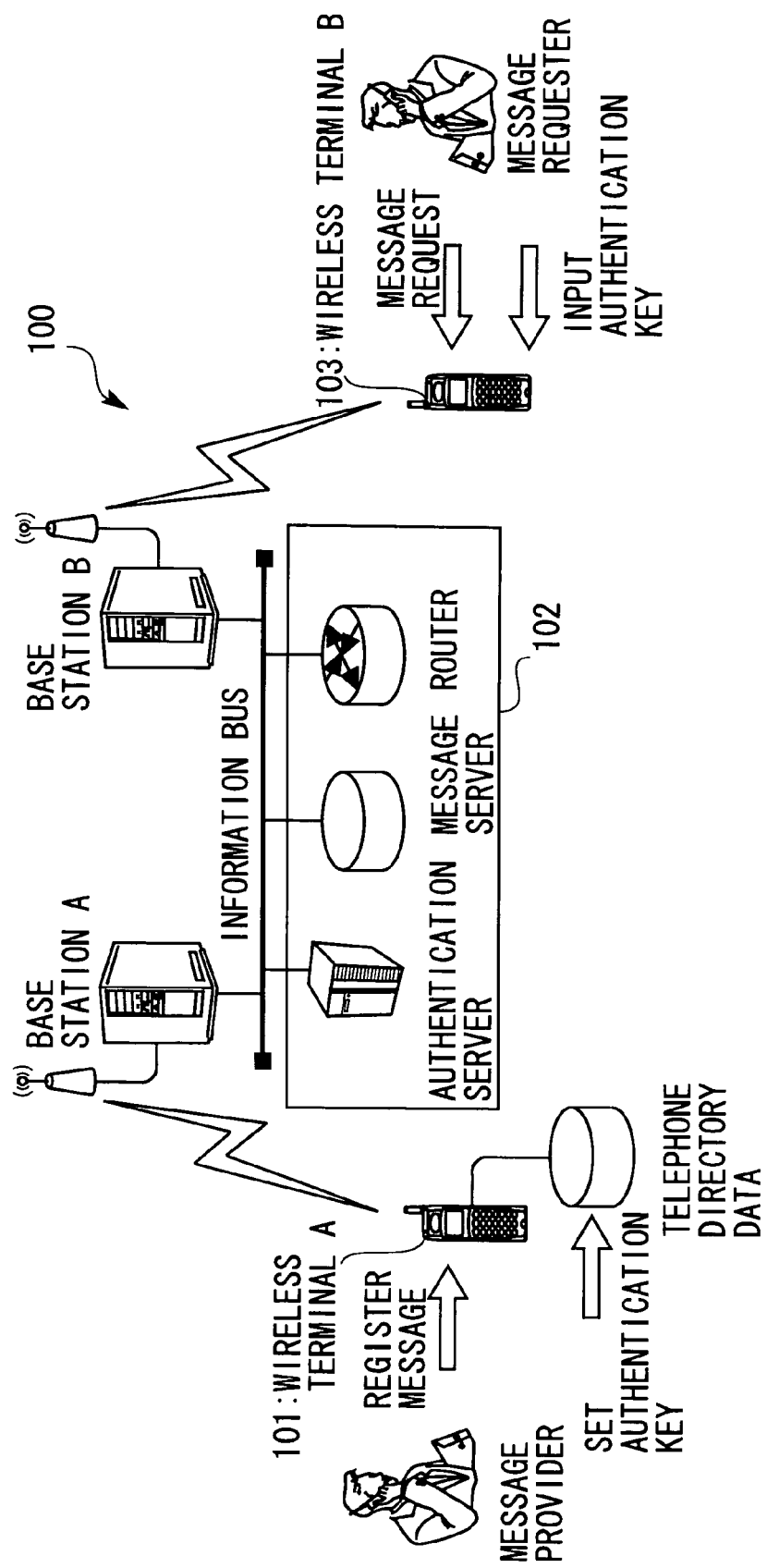
FIG. 1 is a schematic view of an authentication system in a first embodiment according to the invention.
Figure 2:
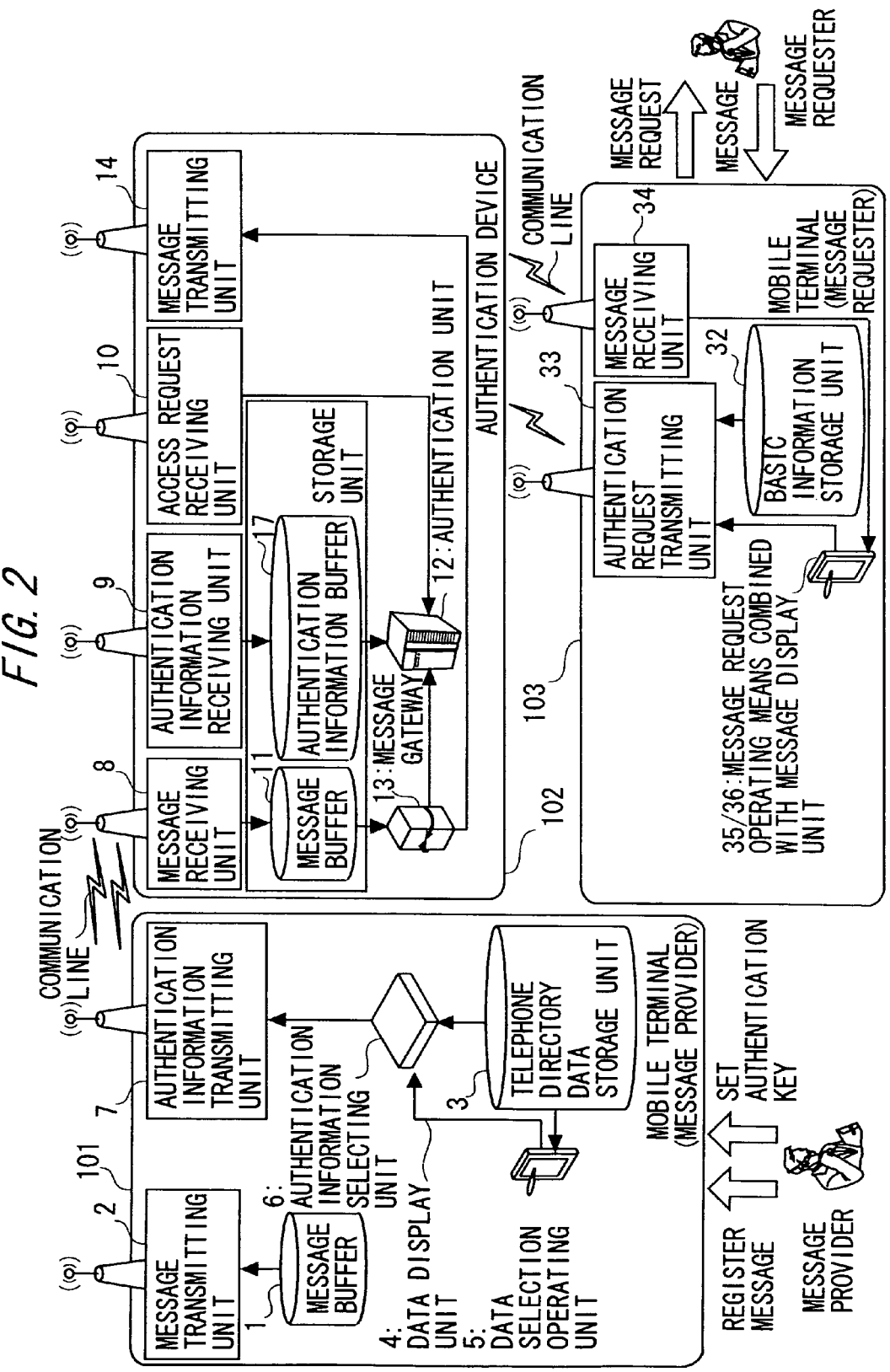
FIG. 2 is a schematic diagram of an architecture of the authentication system in the first embodiment according to the invention.

FIG. 1 is a conceptual view of an authentication system according to the invention, and FIG. 2 is a schematic diagram of a configuration in the first embodiment. An authentication system 100 in the example includes a transmitting terminal 101, an authentication device 102 and a receiving terminal 103 that are connected via a communication line such as a wireless telephone line and the Internet.

The transmitting terminal 101 registers a message such as an arbitrary text and a location information in the authentication device 102, and the authentication device 102 authenticates the receiving terminal 103 making a request for disclosure of the message and discloses the message to the authenticated receiving terminal 103.

Herein, the transmitting terminal 101 selects an arbitrary piece of information from an address book etc. and can transmit this information as authentication information, and the authentication device 102 makes the authentication on the basis of this arbitrarily-selected information. Through this authentication, the authentication system of the invention facilitates inputting of the authentication information from on the transmitting terminal 101 and enables high security to be ensured.

§Transmitting Terminal

The transmitting terminal 101 is a computer (an information processing device) including an arithmetic processing unit such as a CPU (Central Processing Unit), a storage unit (a hard disc, a nonvolatile RAM, etc.) stored with data and software for an arithmetic process, an input unit such as a keyboard (an operation button etc.) and a touch panel (a data selection operating unit 5), an output unit such as a display device (a data display unit) 4 and a loudspeaker, a communication control unit, and soon. Further, in the first embodiment, even a mobile terminal such as a notebook type personal computer and a PDA (Personal Digital Assistant) with a constraint in terms of sizes etc. of the input unit and of the display device, can be preferably employed as the transmitting terminal 101 because of their being easy to input the authentication information.

Figure 4:
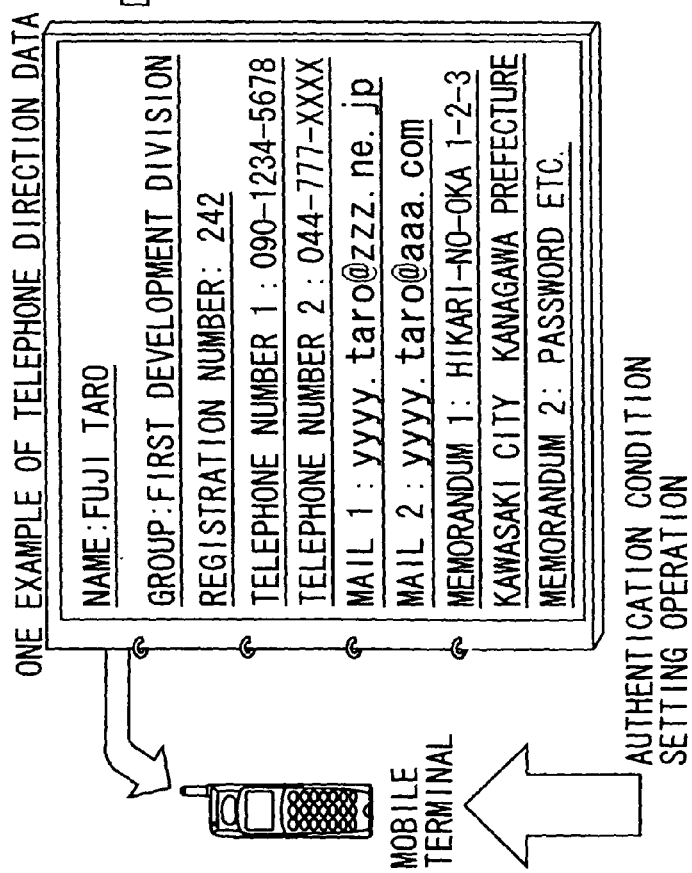
FIG. 4 is a diagram showing one example of telephone directory data.

The storage unit is preinstalled with an operating system (OS) and an application program (a program for transmitting the authentication information). Further, the storage unit functions as a message buffer 1 for temporarily storing (buffering) the message inputted from the input unit and as an information storage unit (a telephone directory data storage unit) 3 stored with plural records of other user information. FIG. 4 is a diagram showing one example of the telephone directory data. As shown in FIG. 4, in the first embodiment, the storage unit is stored with (records each containing) plural items of information on a plurality of users, such as a name, a group, a registration number, telephone numbers, mail addresses and memorandums.

The communication control unit properly includes communication interfaces for a wireless LAN, Bluetooth (registered trademark), an RF tag (Radio Frequency tag), etc., and thus controls the communications with other computers.

The arithmetic processing unit properly reads the OS and the application program from the storage unit and executes the OS and the application program, and executes the arithmetic process of the information inputted from the input unit and from the communication control unit and of the information read from the storage unit, thereby functioning as the message transmitting unit 2, the selecting unit (authentication information selecting unit) 6 and the authentication information transmitting unit.

The arithmetic processing unit functioning as this message transmitting unit 2 transmits the message to the authentication device 102 and gets the message registered therein. The message may be information transmittable via the communication line, such as the arbitrary text, an (static) image, a dynamic image and location information. Further, this message is not limited to the information generated by the transmitting terminal 101 and may also be information generated, as in the case of the location information, by a base station to which the transmitting terminal 101 or by the authentication device 102 etc. that acquires signals from the base station by employing a cell-based positioning system or a multi base station positioning system. Namely, the message may also be such that the information generated by another computer is registered in the authentication device 102 in accordance with an instruction transmitted from the message transmitting unit.

The selecting unit 6 selects, based on a user's operation through the data selection operating unit 5, an arbitrary item of information such as the telephone number, the name and the mail address as the authentication information from the telephone directory data storage unit 3.

The authentication information transmitting unit 7 transmits the authentication information to the authentication device 102.

§Authentication Device 102

The authentication device 102 is a computer (an information processing device) including an arithmetic processing unit such as a CPU (Central Processing Unit), a storage unit (a hard disc) stored with data and software for an arithmetic process, and a communication control unit for controlling the communications with other computers.

The storage unit is preinstalled with an operating system (OS) and an application program (an authentication program). The storage unit functions also as a message buffer 11 stored with the message received from the transmitting terminal and as a registration unit (an authentication information buffer) 17 that registers the authentication information associated with the message.

The arithmetic processing unit properly reads the OS and the application program from the storage unit and executes the OS and the application program, and executes the arithmetic process of the information inputted from the communication control unit and the information read from the storage unit, thereby functioning as a message receiving unit 8, an authentication information receiving unit 9, a registration unit, a request receiving unit 10, an authenticating unit 12, a message gateway 13 and a message transmitting unit 14.

The arithmetic processing unit, as the message receiving unit 8, receives the message from the transmitting terminal 101 and stores the received message on the message buffer 11, and, as the authentication information receiving unit 9, receives the authentication information from the transmitting terminal 101 and stores the received authentication information on the authentication information buffer 17.

The arithmetic processing unit, as the registration unit, resisters the message and the authentication information on the storage unit in a way that associates the message and the authentication information with each other. In the first embodiment, the message receiving unit 8 and the authentication receiving unit 9, which serve as this registration unit, attach the message and the authentication information with a piece of information specifying the associated relationship, thus storing the message buffer 11 and the authentication information buffer 17 with the message and the authentication information, respectively.

The arithmetic processing unit, as the request receiving unit 10, receives a request that purports an acquisition of the message from the receiving terminal 103.

The arithmetic processing unit, as the authenticating unit 12, determines, based on the authentication information received from the receiving terminal and the authentication information registered on the registration unit, whether to authenticate or not.

The arithmetic processing unit, as the message transmitting unit 14, when the message acquisition request sent from the receiving terminal 103 is authenticated by the authenticating unit 12, transmits the message to the receiving terminal 103.

§Receiving Terminal

The receiving terminal 103 is a general type of computer (an information processing device) including an arithmetic processing unit such as a CPU (Central Processing Unit), a storage unit (a hard disc) stored with data and software for an arithmetic process, an input unit 35 such as a keyboard (an operation button etc.) and a touch panel, an output unit such as a display device 36 and a loudspeaker, a communication control unit, and soon. Further, in the first embodiment, even a mobile terminal such as a notebook type personal computer and a PDA (Personal Digital Assistant) with a constraint in terms of sizes etc. of the input unit and of the display device, can be preferably employed as the receiving device 103 because of their being easy to input the authentication information.

The storage unit is preinstalled with an operating system (OS) and an application program (a program for transmitting the authentication information). Further, this storage unit functions also as a basic information storage unit 32 prestored with user information.

The arithmetic processing unit properly reads the OS and the application program from the storage unit and executes the OS and the application program, and executes the arithmetic process of the information inputted from the communication control unit and of the information read from the storage unit, thereby functioning also as an authentication request transmitting unit (corresponding to the message request unit and the authentication information transmitting unit) 33 and a message receiving unit 34.

The arithmetic processing unit, as the authentication request transmitting unit 33, requests the authentication device 102 to acquire the message, and transmits the authentication information for acquiring the message to the authentication device 102.

The arithmetic processing unit, as the message receiving unit 34, receives the message from the authentication device 102 and gets the message displayed on the display device. Further, The arithmetic processing unit gets the message stored on the storage unit.

§Authentication Method

Figure 3:
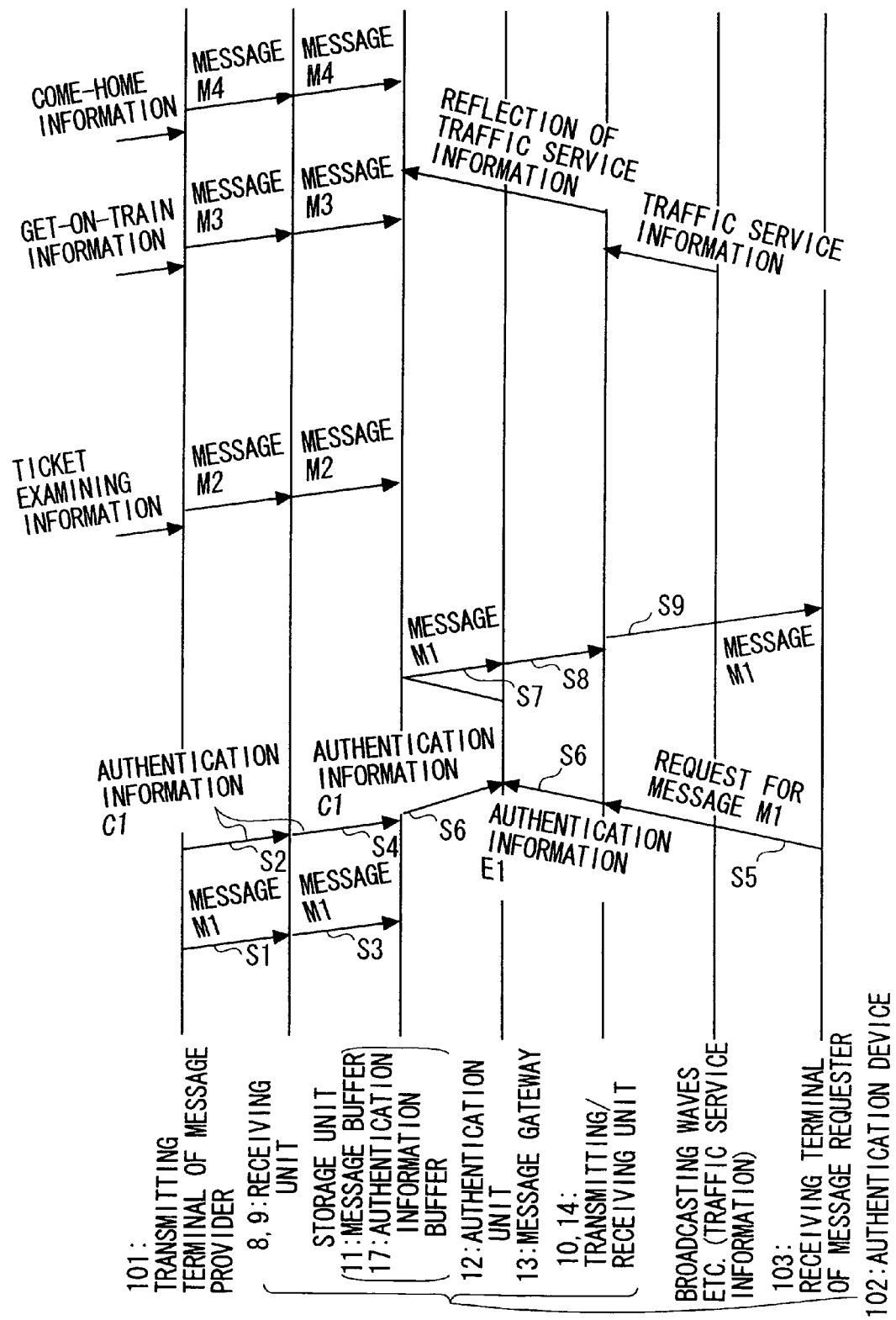
FIG. 3 is an explanatory diagram of an authentication method in the first embodiment according to the invention.

Next, an authentication method in the system 100 will be explained. FIG. 3 shows a case of providing present location information of a message provider.

To begin with, through an operation of the message provider, the message transmitting unit of the transmitting terminal 101 sends a message M1 to the authentication device 102 (step 1, which will hereinafter be abbreviated such as S1). An arbitrary text such as [I'll now come home.] may be inputted as this message M1 from on the data selection operating unit 5, and the message M1 may also be information that is automatically transmitted by the transmitting terminal 101. For example, the transmitting terminal 101, when connected to the wireless LAN, detects which access point the terminal 101 itself is connected to, and sends location information (company, school, station), which is preset with respect to this access point, to the authentication device 102.

Further, the transmitting terminal 101 sends authentication information C1 for acquiring the message to the authentication device 102 (S2). For instance, the transmitting terminal 101, on the occasion of having transmitted the message, reads the telephone directory data and, as shown in FIG. 4, displays a selection screen for the authentication information. When the message provider selects arbitrary items of data by operating the operating unit 5, the transmitting terminal 101 transmits the selected data to the authentication information transmitting unit of the authentication device 102. In FIG. 4, items of information are selected by checking checkboxes provided at heads (left ends) of the respective items, wherein the items, i.e., a name, a telephone number 1, a mail 1 and a memorandum 1, which are the items with the checkboxes 51 set in a selected (checked) status, are sent as the authentication information C1.

The authentication device 102, upon receiving the message through the message receiving unit 8, stores the message on the message buffer 11 (S3). Further, the authentication device 102, when receiving the authentication information C1 through the authentication information receiving unit 31, registers the authentication information C1 on the message buffer 17 in a way that associates the authentication information C1 with the message (S4).

Then, when a message requester performs a message request operation, the receiving terminal 103 reads, by use of the authentication request transmitting unit 33, the basic information (a name, a telephone number, a memorandum, etc.) of the user from the basic information storage unit 32, sends this basic information as authentication information E1 to the authentication device 102, and thus requests the acquisition of the message (S5).

In response to this request, the authenticating unit 12 of the authentication device 102 determines, based on the authentication information E1 received from the receiving terminal 103 and the authentication information C1 registered on the registration unit, whether to authenticate or not (S6). In this example, the authentication is done if both pieces of authentication information are coincident with each other. The items sent as the authentication information E1 from the receiving terminal 103 may be predetermined between the message provider and the authentication device 102, and the authentication device 102 may also, after all the items on the information storage unit which are in this example a group, a registration number, a telephone number 1, a telephone number 2, a mail 1, a mail 2, a memorandum 1 and a memorandum 2 have been sent, employ necessary items among these transmitted items.

For example, in the setting in FIG. 4, [name AND telephone number 1 AND mail 1 AND memorandum 1] is an authentication condition, and hence, in the case of receiving [Fiji Taro, 090-1234-5678, fujitsu.taro@docomo.ne.jp, Hikarino 1-2-3, Kawasaki City, Kanagawa Prefecture] as the authentication information E1 from the receiving terminal 103, the authentication device 102 judges that both pieces of authentication are coincident with each other and thus makes the authentication.

The coincidence in this case is not limited to a case where both pieces of authentication information are strictly the same but may allow a swing in notation. For example, a difference between a capital letter and a lower-case letter and a difference between an Arabic numeral and a Roman numeral are ignored. Further, it is judged that a front part and a rear part of a name delimited by a space represent a family name and a first name, wherein the authentication information deems coincident if the family name or the first name is identical. The authentication is made if having substantially the same content as in such a case that the town name and the address are identical, the coincidence may be given though a name of the largest administrative unit of Japanese local government is omitted and soon, and the coincidence may be thus established if the predetermined condition is satisfied.

The authenticating unit 12, if authenticated from the coincidence of the authentication information, outputs an authentication approval signal to the message gateway 13. The message gateway 13 reads the message M1 from the message buffer 11 (S7), and transfers the message M1 to the message transmitting unit 14 (S8).

The message transmitting unit 14 sends the message M1 from the message gateway 13 to the message requester (S9).

Then, the receiving terminal 103 of the message requester receives the message M1 by the message receiving unit 34, and displays the message M1 on the message display unit 36, thus presenting the message M1 to the message requester.

Further, the message registered on the authentication device 102 can be updated at any time. The message may be updated by the message provider's inputting an arbitrary text in the same way as the above-mentioned and may also be automatically updated based on the information detected by the transmitting terminal and the authentication device 102. For example, in the case of utilizing a system for automatically checking a ticket by transmitting RF tag information of the transmitting terminal 101 to an automatic ticket checking-and-collecting machine in order to get on a train, the communication control unit detects through communications with the automatic ticket checking-and-collecting machine which station the ticket has been checked at, and outputs the detected ticket checking information to the message buffer 1. The message transmitting unit 2 sends this ticket checking information as a message M2 to the authentication device 102, thus getting the message updated.

Further, the communication control unit of the transmitting terminal 101, in the case of performing the communications via the wireless LAN, acquires information on access points for connection, and, when connecting to a predetermined access point or finishing the connection to the predetermined access point, outputs a message corresponding thereto to the message buffer 1. For instance, the communication control unit outputs a message such as [come to the office] when connecting to the LAN at the office, [leave the office] when finishing the connection to the LAN at the office, [on the train] when connecting to the LAN in the train, [get off the train]

when finishing the connection to the LAN in the train, and [in home] when connecting to the LAN in home. It is to be noted that, for specifying which access point the transmitting terminal 101 is connected to and which message the transmitting terminal 101 outputs via this access point and also specifying which access point the transmitting terminal 101 finishes the connection to and which message the transmitting terminal 101 outputs in this case, associated relationships between identifying information of these access points and the messages are preset. In FIG. 3, the information (the get-on-train information) about getting on the train is transmitted as a message M3 to the authentication device 102, and information (come-home-information) about coming home is transmitted as a message M4 to the authentication device 102.

With this setting, the authentication device 102 can update the message on the message buffer 11 at any time, and can provide the updated message (location information) to the message requester.

Note that the authentication device 102 may also generate the message. For example, if able to specify from the get-on-train information (from the message M3) which train the user got on, the authentication device 102 receives a timetable and information on an accident, a delay, etc that are provided as carried on broadcasting waves and via the Internet etc. and, if the accident or the delay occurs in the train, generates based on this information a message such as [the train No. XX, a 30-min delay, scheduled to arrive at the nearest station at XX:XX], and updates the message M3 on the message buffer 11. Note that the storage unit of the authentication device 102 is previously stored with personal information, necessary for generating the message, about the nearest station, a commuting route, a position of the home of the message provider in addition to traffic information.

§Effect of Embodiment

In the prior arts, the authentication is conducted based on an ID and a password, and therefore both of the message provider and the message requester need to manage the ID and the password. Further, it is impossible to support a case of desiring to disclose the message to only specified requesters for the time being for convenience's sake of the message provider.

In the embodiment, in the data of the telephone directory originally built in the mobile terminal, the message provider can select and employ plural items of information as a key for the authentication without any restriction, and it is therefore possible to basically simplify the management of the ID and the password or to make the management unnecessary. Further, a flexible and fine message providing service can be actualized by taking a configuration that makes it possible to change the approval condition for providing the message as intended on the telephone directory display screen.

Accordingly, in the system 100, on the transmitting terminal 101 and on the receiving terminal 103, the authentication information can be easily inputted by the selecting operation. Besides, the system 100, among the items of information, uses one item or plural items of arbitrarily selected information as the authentication information, and hence, unlike the prior arts, the security can be ensured without being fixed by the mail address etc.

Second Embodiment

FIG. 5 is a schematic diagram of a second embodiment according to the present invention. The second embodiment is different from the first embodiment discussed above in terms of a configuration for modifying the authentication device of the update of the authentication information from the transmitting terminal in order to authenticate the already-registered message, and other configurations are the same. In the second embodiment, the same components as those in the first embodiment are marked with the same numerals and symbols, and thus the repetitive explanations are omitted.

The arithmetic processing unit of the transmitting terminal 101 functions also as an update signal transmitting unit 15 in addition to the functions in the first embodiment. The update signal transmitting unit 15 transmits update information for updating the authentication information to the authentication device.

Further, the arithmetic processing unit of the authentication device 102 functions also as an update signal receiving unit 16 in addition to the functions described above. The update signal receiving unit 16 receives the update information from the transmitting terminal, and up dates the authentication information stored on the authentication information registration unit 31.

FIG. 6 is an explanatory diagram of an authentication method by the system 100 in the second embodiment. A procedure of transmitting the message from the transmitting terminal 101, then registering the message on the authentication device 102 and providing the message in response to the request from the receiving terminal 103, is the same as steps 1 through 9. In the case of desiring to change the authentication information C1 associated with the already-registered message M1, the message provider, by operating the transmitting terminal 101, selects the message and also selects the information serving as the authentication information. Corresponding to this operation, on the transmitting terminal 101, the update signal transmitting unit 15 transmits to the authentication device 102 a signal (update signal) showing a purport of updating the authentication information of the selected message (which is M1 in this example) (S21), and the authentication information transmitting unit 7 sends the selected information as a new piece of authentication information C1a to the authentication device 102 (S22).

On the authentication device 102, the update signal receiving unit receives the update signal, and the authentication information receiving unit receives the new authentication information C1a, whereby the authentication information C1 of the message M1 is updated into the authentication information C1a on the basis of the update signal (S23).

Accordingly, when receiving the previous authentication information after being updated (S24), this is an authentication failure, and, only when receiving the authentication information (which is E1a in the example in FIG. 8) coincident with the new authentication information C1a (S25), the authentication is done.

Thus, in the second embodiment, the message requester to be authenticated and a level of the security can be varied by changing the authentication information even after registering the message. In this case also, the authentication information can be inputted by the selection and easily updated.

Third Embodiment

FIG. 7 is a schematic diagram of a third embodiment according to the invention. The third embodiment is different from the second embodiment discussed above in terms of a configuration for requesting, if deficient of the authentication information transmitted to the authentication device from the receiving terminal, the receiving terminal to add the authentication information, and other configurations are the same. In the third embodiment, the same components as those in the second embodiment are marked with the same numerals and symbols, and the repetitive explanations are omitted.

The arithmetic processing unit of the authentication device 102, in addition to the functions in the second embodiment, functions also as an additional information request unit 18. The additional information request unit 18, if deficient of the authentication information received from the receiving terminal 103, sends a request for the additional authentication information to the receiving terminal 103.

Further, the arithmetic processing unit of the receiving terminal 103, in addition to the functions described above, functions also as an addition request receiving unit 19. The additional request receiving unit 19 receives the addition request of the authentication information from the authentication device 102.

Figure 8:
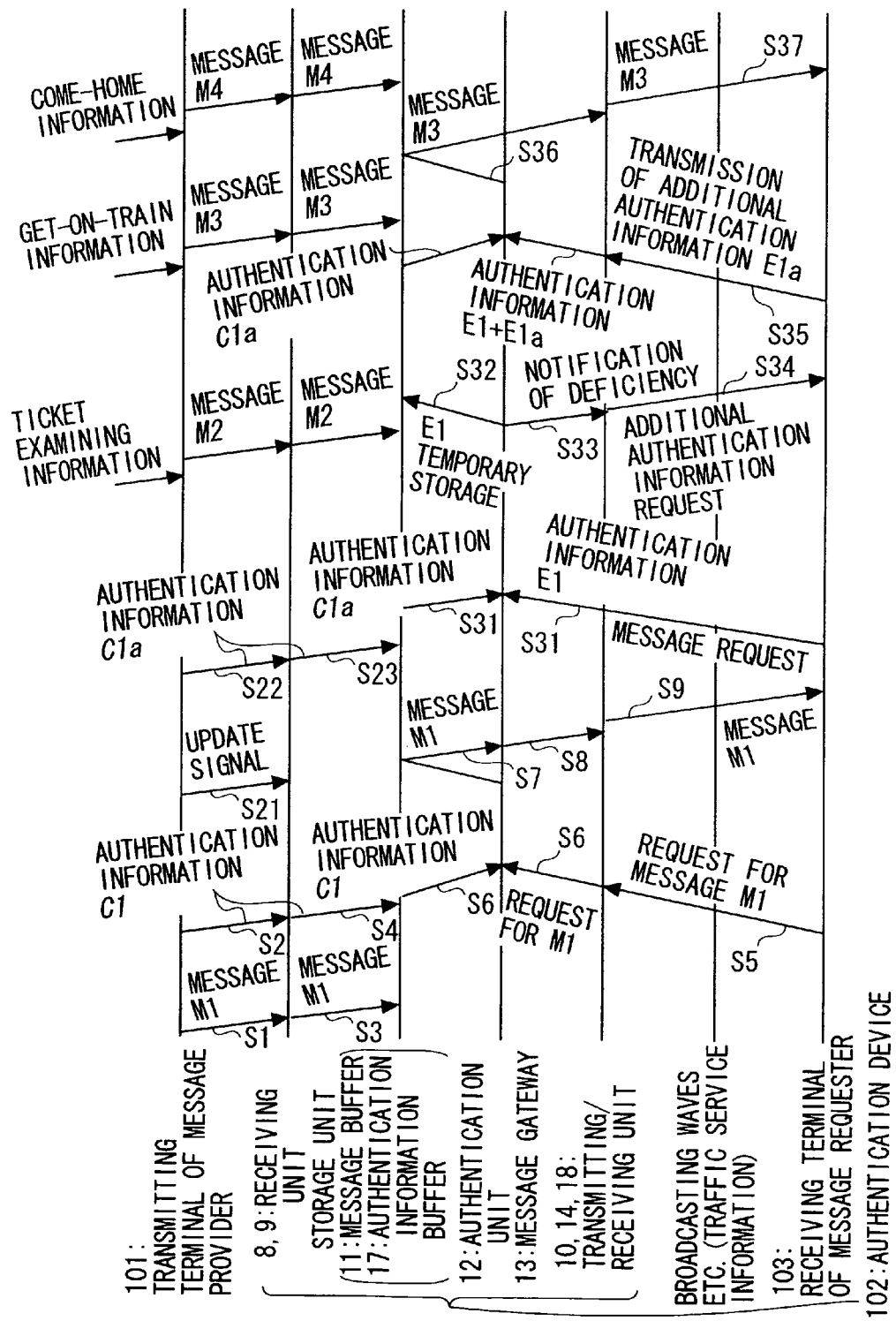
FIG. 8 is an explanatory diagram of the authentication method in the third embodiment according to the invention.

FIG. 8 is an explanatory diagram of the authentication method by the system 100 in the third embodiment. A procedure of transmitting the message from the transmitting terminal 101, then registering the message on the authentication device 102 and acquiring the message from the receiving terminal 103, is the same as steps 1 through 9.

Then, in step 31, the authenticating unit 12 of the authentication device 102 compares the authentication information E1 received from the receiving terminal 103 with the authentication information C1a received from the transmitting terminal 101, and, if deficient of the authentication information E1, temporarily stores the authentication information E1 on the authentication information buffer 17 without making the authentication (S32). When the authenticating unit 12 judges that the authentication information is deficient (S33), the additional information request unit 18 sends the additional authentication information request to the receiving terminal 103 (S34).

The addition request receiving unit 19 of the receiving terminal 103, when receiving this addition request, displays a purport saying the deficiency in the authentication information on the message display unit 36, and prompts the message requester to input additional authentication information. When the message requester selects the basic information serving as the additional authentication information, the receiving terminal 103, by use of the authentication request transmitting unit 33, reads the selected basic information from the basic information storage unit 32 and transmits the selected information as additional authentication information E1a to the authentication device 102 (S35).

On the authentication device 102 receiving the additional authentication information E1a, the authenticating unit 12 compares the authentication information E1 added with the additional authentication information E1a with the authentication information C1a once again, and repeats the addition request till the coincidence is attained.

Then, if the authentication information E1+E1a is coincident with the authentication information C1a (S36), the message (which is M3 in this example) is sent to the receiving terminal 103 (S37).

Thus, in the third embodiment, if deficient of the authentication information sent from the receiving terminal, this authentication information is rendered staying on the buffer, the re-request for the authentication is facilitated by requesting only the deficient information to be added. Further, in this case also, the additional authentication information can be inputted by the selection, and the information can be easily added.

It should be noted that the embodiment described above has exemplified the example of transmitting the content of the telephone directory such as [Fiji Taro, 090-1234-5678, fujitsu.taro@docomo.ne.jp, Hikarino 1-2-3, Kawasaki City, Kanagawa Prefecture] as the Authentication information from the transmitting terminal 110, however, such information may also be transmitted to the authentication device 102 that [name: Fiji Taro, telephone number: 090-1234-5678, mail 1: fujitsu.taro@docomo.ne.jp, address: Hikarino 1-2-3, Kawasaki City, Kanagawa Prefecture], wherein the item names are associated with the contents of the items. In this example, in these items of data delimited by commas, the item names are given before colons, and the contents of the items are given after the colons. Then, such a configuration may also be taken that the authentication device 102 stores the authentication buffer 17 with the item names and the contents of the items, then notifies the receiving terminal 103 receiving the message request of the item names needed for the authentication such as [name?, telephone number? . . . ] and prompts the terminal 103 to input the item contents corresponding thereto. With this configuration, for instance, the authentication device 102, if deficient of the authentication information received from the receiving terminal 103, indicates the item name of the deficient authentication information to the receiving terminal 103 and can prompts the terminal 103 to input the deficient information, thereby further facilitating the inputting. Note that as to the notification of the item names, the authentication device may notify of part of the should-be-inputted items. For example, the authentication device notifies the receiving terminal 103 with all the items being uncoincident that the authentication gets into a failure, and indicates the remaining item names to the receiving terminal 103 with the name and the telephone number being coincident, thus enabling the arbitrary settings of an item display condition and of the items, depending on the level of the security required.

Fourth Embodiment

FIG. 9 is a schematic diagram of a fourth embodiment according to the invention. The fourth embodiment is different from the third embodiment discussed above in terms of a configuration for requesting the message provider for approval if the message request from the receiving terminal is not authenticated by the authentication device, and other configurations are the same. In the fourth embodiment, the same components as those in the first embodiment are marked with the same numerals and symbols, and thus the repetitive explanations are omitted.

The arithmetic processing unit of the receiving terminal 103, in addition to the functions in the third embodiment, functions also as an approval request unit 22. The arithmetic processing unit, as the approval request unit 22, transmits to the authentication device 102 an approval request signal for directly requesting the transmitting terminal 101 for approval for acquiring the message. Further, a touch panel on the receiving terminal 103 serves also as an approval request operating unit 21 used for performing an approval request operation.

The arithmetic processing unit of the authentication device 102, in addition to the functions described above, functions also as an approval request receiving unit 23 and an approval request transmitting unit 24. The approval request receiving unit 23 transfers the approval request signal received from the receiving terminal 103 to the approval request transmitting unit 24, and the approval request transmitting unit 24 transfers this approval request signal to the transmitting terminal 101.

The arithmetic processing unit of the transmitting terminal 101, in addition to the functions described above, functions also as an approval request receiving unit 25. The approval request receiving unit 25 receives the approval request signal from the authentication device 102. Further, a touch panel of the transmitting terminal 101 serves also as an approval request display unit 26 for receiving the approval request signal.

Figure 10:
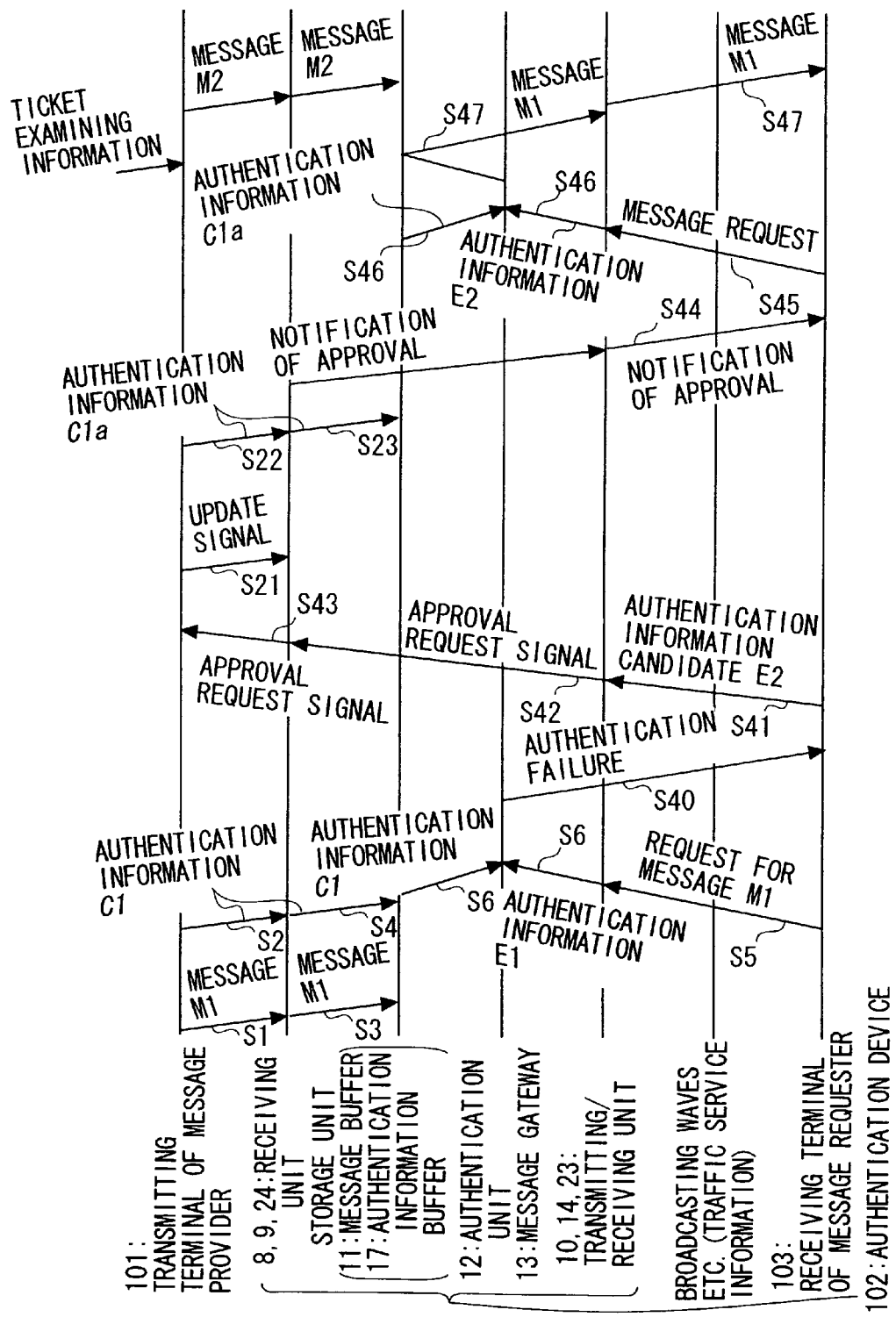
FIG. 10 is an explanatory diagram of the authentication method in the fourth embodiment according to the invention.

FIG. 10 is an explanatory diagram of the authentication method by the system 100 in the fourth embodiment. A procedure of transmitting the message from the transmitting terminal 101, then registering the message on the authentication device 102 and requesting the message from the receiving terminal 103, is the same as steps 1 through 5.

Then, in step 6, if the authentication information E1 from the receiving terminal 103 is not coincident with the authentication information C1 from the transmitting terminal 101, the authenticating unit 12 of the authentication device 102 notifies the receiving terminal 103 of an authentication failure (S40). The message display unit of the receiving terminal 103 receiving the notification displays a purport that the message can not be acquired.

In response to this, when the message requester makes an approval request by operating the approval request operating unit 21, the approval request transmitting unit 22 of the receiving unit 103 transmits the approval request signal to the authentication device 102 (S41). Hereat, the approval request signal is made to contain candidate information for the authentication information employed when making the message request. For example, the message requester selects an arbitrary information as the candidate information for the authentication information from the basic information storage unit 32, and the approval request transmitting unit gets a candidate E2 for the authentication information contained in the approval; request signal.

The authentication device 102 receives this approval request signal by the approval request receiving unit 23 (S42), and transfers the approval request signal to the transmitting terminal 101 defined as a source of providing the message by the approval request transmitting unit 24 (S43).

The transmitting terminal 101 displays, based on the approval request signal received by the approval request receiving unit 25, displays the candidate for the authentication information on the approval request display unit 26.

The message provider judges from seeing the displayed candidate for the authentication information whether the message acquisition is approved or not, and inputs the approval or non-approval by operating the data selection operating unit 5. Herein, if the approval of the message acquisition is inputted, the transmitting terminal 101 updates the authentication information of the message in the same way as steps 21 through 22. Namely, the update signal transmitting unit 15 transmits to the authentication device 102 a signal (approval signal) showing a purport that the authentication information of the approved message M1 is updated (S21), and the authentication information transmitting unit 7 transmits the candidate as a new piece of authentication information C1a to the authentication device 102 (S22). Note that the candidate for the authentication information may be set as the new authentication information as it is, and, after the message provider has executed candidate editing such as selecting another piece of information and adding the authentication information or deleting part of the candidate, this edited information may also be set as the new authentication information.

The authentication device 102 receives the approval signal by the update signal receiving unit, then receives the new authentication information C1a by the authentication information receiving unit, and updates the authentication information C1 of the message M1 into the authentication information C1a on the basis of the approval signal (S23). Further, the authentication device 102 transmits the signal (approval notification) showing the purport of being approved to the receiving terminal 103 (S44).

The receiving terminal 103 receiving the approval notification redoes the message request in a way that sets the authentication information candidate as authentication information E2 (S45).

In response to this request, the authentication device 102 compares the post-updating authentication information C1a with the authentication information E1a used when redoing the request by using the authenticating unit 12 (S46), then, if coincident, makes the authentication, and transmits the message M1 to the receiving terminal 103 by the message transmitting unit 24 (S47). Note that if the authentication information E2 is deficient for the authentication information C1a as a result of the message provider editing the candidate for the authentication information, in the same way as in the third embodiment, the authentication device 102 may request the receiving terminal 103 for the deficiency in the authentication information.

Moreover, the fourth embodiment takes the configuration for transmitting the candidate for the new authentication information from the receiving terminal 103, however, without being limited to this configuration, such a configuration may also be taken that only the signal with a purport of simply requesting the approval is transmitted from the receiving terminal, and the authentication information is inputted from the transmitting terminal 101.

As described above, according to the fourth embodiment, even when the message request from the receiving terminal is not authenticated by the authentication device, the approval can be directly requested of the message provider. With this contrivance, even if the message provider registers incorrect pieces of information and old information about the message requester in the telephone directory, the proper authentication can be executed in a way that updates the authentication information.

Others

The invention is not limited to only the illustrated examples given above and can be, as a matter of course, changed in a variety of forms in the range that does not deviate from the gist of the invention.

Further, the components thereof can be combined to the greatest possible degree.

INCORPORATION BY REFERENCE

The disclosures of Japanese patent application No. JP2005-230635 filed on Aug. 9, 2005 including the specification, drawings and abstract are incorporated herein by reference.

What is claimed is:

1. An authentication system including a transmitting terminal, a receiving terminal and an authentication device that are connected via a communication line, the transmitting terminal comprising:
message transmitting unit to transmit and register a message to and in the authentication device;
information storage unit to be stored with plural items of information related to the receiving terminal;
selecting unit to select information to be adopted and information not to be adopted among information stored in the information storage unit according to the user operation as authentication information for accessing the message; and authentication information transmitting unit to transmit the authentication information including plural items of the adopted information related to the receiving terminal to the authentication device, the authentication device comprising;

message receiving unit to receive the message from the transmitting terminal;

authentication information receiving unit to receive the authentication information including the plural items of the adopted information related to the receiving terminal from the transmitting terminal;

registering unit to register the message and the authentication information in a way that associates the message and the authentication information with each other;

request receiving unit to receive a request showing a purport of acquiring the message and the authentication information for acquiring the message from the receiving terminal;

authenticating unit to authenticate the receiving terminal, if both the authentication information including item of information received from the receiving terminal and the authentication information including the plural items of the adopted information related to the receiving terminal registered on the registering unit, which the authentication information receiving unit receives from the transmitting terminal, are coincident with each other; and message transmitting unit to transmit, if the authenticating unit authenticates the receiving terminal, the message corresponding to the authentication information to the receiving terminal, the receiving terminal comprising:

message request unit to request acquisition of the message;

authentication information transmitting unit to transmit the authentication information for acquiring the message to the authentication device; and message receiving unit to receive the message from the authentication device.

2. An authentication system according to claim 1, wherein the transmitting terminal comprises updating unit to transmit update information for updating the authentication information to the authentication device, and the authentication device comprises updating unit to update the authentication information registered on the registering unit on the basis of the update information.

3. An authentication system according to claim 1, wherein the authentication device comprises addition request unit to request, if the item of information received from the receiving terminal is insufficient with respect to the plural items of the adopted information registered on the registering unit, the receiving terminal to add the authentication information to supplement the insufficient item of information.

4. An authentication system according to claim 1, wherein the receiving terminal comprises approval request unit to transmit an approval request signal to the authentication device, the transmitting terminal comprises approval request receiving unit to receive the approval request signal from the authentication device, and approval notifying unit to transmit an approval signal for approving the authentication of the receiving terminal to the authentication device, the authentication device comprises approval request transferring unit to transfer the approval request signal from the receiving terminal to the transmitting terminal, and the authenticating unit authenticates the message acquisition by the receiving terminal when receiving the approval signal from the transmitting terminal.

5. An authentication system according to claim 1, wherein the transmitting terminal stores the information storage unit with plural items of information each having an item name and an item content, the authentication information transmitting unit transmits at least the item name as the authentication information to the authentication device, and the authentication device comprises authentication information request unit to request the receiving terminal for the authentication information on the basis of the item name.

6. A transmitting terminal connected to an authentication device via a communication line wherein the authentication device is requested for access in a message from a receiving terminal and receives an authentication information from the receiving terminal, comprising:

message transmitting unit to transmit and register a message to and in the authentication device;

information storage unit to be stored with plural items of information related to the receiving terminal;

selecting unit to select information to be adopted and information not to be adopted among information stored in the information storage unit according to the user operation as authentication information for authenticating the receiving terminal, wherein the authentication device authenticates the receiving terminal if both the authentication information, which the authentication information receiving unit receives from the transmitting terminal, and authentication information which the authentication device receives from the receiving terminal are coincident with each other; and authentication information transmitting unit to transmit the authentication information including plural items of the adopted information related to the receiving terminal to the authentication device.

7. A transmitting terminal according to claim 6, further comprising updating unit to transmit update information for updating the authentication information to the authentication device.

8. A transmitting terminal according to claim 6, further comprising approval request receiving unit to receive, from the authentication device, an approval request signal that requests approval for the authentication about message acquisition with respect to the receiving terminal requesting the message acquisition from the authentication device, and approval notifying unit to transmit an approval signal for approving the authentication of the receiving terminal to the authentication device.

9. A transmitting terminal according to claim 6, wherein the information storage unit is stored with plural items of information each having an item name and an item content as the information, and the authentication information transmitting unit transmits at least the item name as the authentication information to the authentication device.

10. An authentication device connected to a transmitting terminal and a receiving terminal via a communication line, comprising;

message receiving unit to receive a message from the transmitting terminal;

authentication information receiving unit to receive authentication information including plural items of information related to the receiving terminal from the transmitting terminal;

registering unit to register the message and the authentication information in a way that associates the message and the authentication information with each other;

request receiving unit to receive a request showing a purport of acquiring the message and the authentication information for acquiring the message from the receiving terminal;

authenticating unit to authenticate the receiving terminal, if both authentication information including plural items of information received from the receiving terminal and the authentication information including plural items of information registered on the registering unit, which the authentication information receiving unit receives from the transmitting terminal, are coincident with each other;

message transmitting unit to transmit, if the authenticating unit authenticates the receiving terminal, the message corresponding to the authentication information to the receiving terminal; and addition request unit to request, if the item of information received from the receiving terminal is insufficient with respect to the plural items of information registered on the registering unit, the receiving terminal to add the authentication information to supplement the insufficient item of information.

11. An authentication device according to claim 10, comprising updating unit to update, when receiving update information for updating the authentication information from the transmitting terminal, the authentication information registered on the registering unit on the basis of the update information.

12. An authentication device according to claim 10, comprising approval request transferring unit to transfer, when receiving an approval request signal from the receiving terminal, the approval request signal to the transmitting terminal, wherein and the authenticating unit, when receiving the approval signal for approving the authentication of the receiving terminal, authenticates message acquisition by the receiving terminal.

13. An authentication device according to claim 10, comprising authentication information request unit to request, when receiving at least an item name as the authentication information from the transmitting terminal, the receiving terminal for the authentication information on the basis of the item name.

14. An authentication method executed by an authentication device connected to a transmitting terminal and a receiving terminal via a communication line, comprising steps of:

receiving a message from the transmitting terminal;

receiving authentication information including plural items of information related to the receiving terminal from the transmitting terminal;

registering the message and the authentication information in a way that associates the message and the authentication information with each other;

receiving a request showing a purport of acquiring the message and the authentication information for acquiring the message from the receiving terminal;

authenticating the receiving terminal, if both the authentication information including plural items of information received from the receiving terminal and the registered authentication information including plural items of information, which were received from the transmitting terminal, are coincident with each other;

transmitting, if the receiving terminal has been authenticated, the message corresponding to the authentication information to the receiving terminal; and requesting, if the item of information received from the receiving terminal is insufficient with respect to the items of information registered on the registering means, the receiving terminal to add the authentication information to supplement the insufficient item of information.

15. An authentication method according to claim 14, wherein when receiving the update information for updating the authentication information from the transmitting terminal, the registered authentication information is updated based on the update information.

16. An authentication method according to claim 14, wherein when receiving the approval request signal from the receiving terminal, the approval request signal is transferred to the transmitting terminal, and when receiving from the transmitting terminal an approval signal for approving the authentication of the receiving terminal, message acquisition by the receiving terminal is authenticated.

17. An authentication method according to claim 14, wherein when receiving at least an item name as the authentication information from the transmitting terminal, the authentication information is requested of the receiving terminal on the basis of the item name.

* * * * *